United States Patent
Doan et al.

(10) Patent No.: US 10,803,465 B2
(45) Date of Patent: Oct. 13, 2020

(54) ENABLING HIERARCHICAL STRUCTURE REPRESENTATION OF ENTITIES

(71) Applicant: salesforce.com, inc., San Francisco, CA (US)

(72) Inventors: Dai Duong Doan, Alameda, CA (US); Aleksey Kolesnik, Foster City, CA (US); Rachna Singh, Foster City, CA (US); Muhammad Shahid Khan, Calgary (CA); Aakash Thakkar, Oakland, CA (US); Julia Zhang, Foster City, CA (US); James Hang, San Francisco, CA (US)

(73) Assignee: salesforce.com, inc., San Frnacisco, CA (US)

( * ) Notice: Subject to any disclaimer, the term of this patent is extended or adjusted under 35 U.S.C. 154(b) by 229 days.

(21) Appl. No.: 15/483,237

(22) Filed: Apr. 10, 2017

(65) Prior Publication Data
US 2018/0293586 A1    Oct. 11, 2018

(51) Int. Cl.
G06F 3/14 (2006.01)
G06F 16/16 (2019.01)
G06F 16/26 (2019.01)
G06F 3/0485 (2013.01)
G06F 3/0482 (2013.01)
G06Q 30/00 (2012.01)

(52) U.S. Cl.
CPC ......... *G06Q 30/01* (2013.01); *G06F 3/0482* (2013.01); *G06F 3/0485* (2013.01); *G06F 3/14* (2013.01); *G06F 16/168* (2019.01); *G06F 16/26* (2019.01)

(58) Field of Classification Search
CPC ..... G06Q 30/01; G06F 16/168; G06F 16/185; G06F 16/26; G06F 16/34; G06F 16/345; G06F 17/30221
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz |
| 5,649,104 A | 7/1997 | Carleton |
| 5,715,450 A | 2/1998 | Ambrose et al. |
| 5,761,419 A | 6/1998 | Schwartz |
| 5,819,038 A | 10/1998 | Carleton |
| 5,821,937 A | 10/1998 | Tonelli et al. |

(Continued)

FOREIGN PATENT DOCUMENTS

WO    WO-2007137875 A1 * 12/2007 ............. H04L 67/36

OTHER PUBLICATIONS

U.S. Appl. No. 13/986,251, filed Apr. 16, 2013.

*Primary Examiner* — James E Richardson
(74) *Attorney, Agent, or Firm* — Dergosits & Noah LLP; Todd A. Noah

(57) ABSTRACT

Some embodiments of the present invention include a method for processing entities and may include generating, by a computing system, a hierarchical structure representation of entities from a plurality of entities of an object; receiving, by the computing system, information about a current entity; displaying, by the computing system, the current entity and a number of entities related to the current entity using the hierarchical structure representation of the entities, the number of related entities displayed being based on a display range; and updating, by the computing system, the display of the current entity and the related entities based on detecting a scrolling up action on a graphical user interface associated with the computing system.

33 Claims, 14 Drawing Sheets

(56) References Cited

U.S. PATENT DOCUMENTS

| | | | |
|---|---|---|---|
| 5,831,610 A | 11/1998 | Tonelli et al. | |
| 5,873,096 A | 2/1999 | Lim et al. | |
| 5,918,159 A | 6/1999 | Fomukong et al. | |
| 5,963,953 A | 10/1999 | Cram et al. | |
| 6,092,083 A | 7/2000 | Brodersen et al. | |
| 6,161,149 A | 12/2000 | Achacoso et al. | |
| 6,169,534 B1 | 1/2001 | Raffel et al. | |
| 6,178,425 B1 | 1/2001 | Brodersen et al. | |
| 6,189,011 B1 | 2/2001 | Lim et al. | |
| 6,216,135 B1 | 4/2001 | Brodersen et al. | |
| 6,233,617 B1 | 5/2001 | Rothwein et al. | |
| 6,266,669 B1 | 7/2001 | Brodersen et al. | |
| 6,295,530 B1 | 9/2001 | Ritchie et al. | |
| 6,324,568 B1 | 11/2001 | Diec et al. | |
| 6,324,693 B1 | 11/2001 | Brodersen et al. | |
| 6,336,137 B1 | 1/2002 | Lee et al. | |
| D454,139 S | 3/2002 | Feldcamp et al. | |
| 6,367,077 B1 | 4/2002 | Brodersen et al. | |
| 6,393,605 B1 | 5/2002 | Loomans | |
| 6,405,220 B1 | 6/2002 | Brodersen et al. | |
| 6,434,550 B1 | 8/2002 | Warner et al. | |
| 6,446,089 B1 | 9/2002 | Brodersen et al. | |
| 6,535,909 B1 | 3/2003 | Rust | |
| 6,549,908 B1 | 4/2003 | Loomans | |
| 6,553,563 B2 | 4/2003 | Ambrose et al. | |
| 6,560,461 B1 | 5/2003 | Fomukong et al. | |
| 6,574,635 B2 | 6/2003 | Stauber et al. | |
| 6,577,726 B1 | 6/2003 | Huang et al. | |
| 6,601,087 B1 | 7/2003 | Zhu | |
| 6,604,117 B2 | 8/2003 | Lim et al. | |
| 6,604,128 B2 | 8/2003 | Diec | |
| 6,609,150 B2 | 8/2003 | Lee et al. | |
| 6,621,834 B1 | 9/2003 | Scherpbier | |
| 6,654,032 B1 | 11/2003 | Zhu | |
| 6,665,648 B2 | 12/2003 | Brodersen et al. | |
| 6,665,655 B1 | 12/2003 | Warner et al. | |
| 6,684,438 B2 | 2/2004 | Brodersen et al. | |
| 6,711,565 B1 | 3/2004 | Subramaniam et al. | |
| 6,724,399 B1 | 4/2004 | Katchour et al. | |
| 6,728,702 B1 | 4/2004 | Subramaniam et al. | |
| 6,728,960 B1 | 4/2004 | Loomans et al. | |
| 6,732,095 B1 | 5/2004 | Warshavsky et al. | |
| 6,732,100 B1 | 5/2004 | Brodersen et al. | |
| 6,732,111 B2 | 5/2004 | Brodersen et al. | |
| 6,754,681 B2 | 6/2004 | Brodersen et al. | |
| 6,763,351 B1 | 7/2004 | Subramaniam et al. | |
| 6,763,501 B1 | 7/2004 | Zhu | |
| 6,768,904 B2 | 7/2004 | Kim | |
| 6,772,229 B1 | 8/2004 | Achacoso et al. | |
| 6,782,383 B2 | 8/2004 | Subramaniam et al. | |
| 6,804,330 B1 | 10/2004 | Jones et al. | |
| 6,826,565 B2 | 11/2004 | Ritchie et al. | |
| 6,826,582 B1 | 11/2004 | Chatterjee et al. | |
| 6,826,745 B2 | 11/2004 | Coker | |
| 6,829,655 B1 | 12/2004 | Huang et al. | |
| 6,842,748 B1 | 1/2005 | Warner et al. | |
| 6,850,895 B2 | 2/2005 | Brodersen et al. | |
| 6,850,949 B2 | 2/2005 | Warner et al. | |
| 7,062,502 B1 | 6/2006 | Kesler | |
| 7,340,411 B2 | 3/2008 | Cook | |
| 7,356,482 B2 | 4/2008 | Frankland et al. | |
| 7,401,094 B1 | 7/2008 | Kesler | |
| 7,620,655 B2 | 11/2009 | Larsson | |
| 7,698,160 B2 | 4/2010 | Beaven et al. | |
| 7,779,475 B2 | 8/2010 | Jakobson et al. | |
| 7,851,004 B2 | 12/2010 | Hirao et al. | |
| 8,010,663 B2 | 8/2011 | Firminger et al. | |
| 8,014,943 B2 | 9/2011 | Jakobson | |
| 8,015,495 B2 | 9/2011 | Achacoso et al. | |
| 8,032,297 B2 | 10/2011 | Jakobson | |
| 8,082,301 B2 | 12/2011 | Ahlgren et al. | |
| 8,095,413 B1 | 1/2012 | Beaven et al. | |
| 8,095,594 B2 | 1/2012 | Beaven et al. | |
| 8,209,308 B2 | 6/2012 | Jakobson et al. | |
| 8,275,836 B2 | 9/2012 | Beaven et al. | |
| 8,484,111 B2 | 7/2013 | Frankland et al. | |
| 8,490,025 B2 | 7/2013 | Jakobson et al. | |
| 8,504,945 B2 | 8/2013 | Jakobson et al. | |
| 8,510,664 B2 | 8/2013 | Rueben et al. | |
| 8,566,301 B2 | 10/2013 | Rueben et al. | |
| 8,646,103 B2 | 2/2014 | Jakobson et al. | |
| 9,417,757 B1* | 8/2016 | Caiani | G06F 3/048 |
| 2001/0034733 A1* | 10/2001 | Prompt | G06F 16/252 |
| 2001/0044791 A1 | 11/2001 | Richter et al. | |
| 2002/0072951 A1 | 6/2002 | Lee et al. | |
| 2002/0082892 A1 | 6/2002 | Raffel | |
| 2002/0129352 A1 | 9/2002 | Brodersen et al. | |
| 2002/0140731 A1 | 10/2002 | Subramanian et al. | |
| 2002/0143997 A1 | 10/2002 | Huang et al. | |
| 2002/0162090 A1 | 10/2002 | Parnell et al. | |
| 2002/0165742 A1 | 11/2002 | Robbins | |
| 2003/0004971 A1 | 1/2003 | Gong | |
| 2003/0018705 A1 | 1/2003 | Chen et al. | |
| 2003/0018830 A1 | 1/2003 | Chen et al. | |
| 2003/0061225 A1* | 3/2003 | Bowman | G06Q 10/06 |
| 2003/0066031 A1 | 4/2003 | Laane et al. | |
| 2003/0066032 A1 | 4/2003 | Ramachandran et al. | |
| 2003/0069936 A1 | 4/2003 | Warner et al. | |
| 2003/0070000 A1 | 4/2003 | Coker et al. | |
| 2003/0070004 A1 | 4/2003 | Mukundan et al. | |
| 2003/0070005 A1 | 4/2003 | Mukundan et al. | |
| 2003/0074418 A1 | 4/2003 | Coker et al. | |
| 2003/0120675 A1 | 6/2003 | Stauber et al. | |
| 2003/0151633 A1 | 8/2003 | George et al. | |
| 2003/0159136 A1 | 8/2003 | Huang et al. | |
| 2003/0184588 A1* | 10/2003 | Lee | G06Q 30/02 715/772 |
| 2003/0187921 A1 | 10/2003 | Diec et al. | |
| 2003/0189600 A1 | 10/2003 | Gune et al. | |
| 2003/0204427 A1 | 10/2003 | Gune et al. | |
| 2003/0206192 A1 | 11/2003 | Chen et al. | |
| 2004/0001092 A1 | 1/2004 | Rothwein et al. | |
| 2004/0015981 A1 | 1/2004 | Coker et al. | |
| 2004/0027388 A1 | 2/2004 | Berg et al. | |
| 2004/0128001 A1 | 7/2004 | Levin et al. | |
| 2004/0186860 A1 | 9/2004 | Lee et al. | |
| 2004/0193510 A1 | 9/2004 | Catahan et al. | |
| 2004/0199489 A1 | 10/2004 | Barnes-Leon et al. | |
| 2004/0199536 A1 | 10/2004 | Barnes-Leon et al. | |
| 2004/0243616 A1* | 12/2004 | Benhase | G06F 9/451 |
| 2004/0249854 A1 | 12/2004 | Barnes-Leon et al. | |
| 2004/0260534 A1 | 12/2004 | Pak et al. | |
| 2004/0260659 A1 | 12/2004 | Chan et al. | |
| 2004/0268299 A1 | 12/2004 | Lei et al. | |
| 2005/0050555 A1 | 3/2005 | Exley et al. | |
| 2005/0091098 A1 | 4/2005 | Brodersen et al. | |
| 2005/0132303 A1* | 6/2005 | Grotjohn | G06F 16/168 715/853 |
| 2006/0059441 A1* | 3/2006 | Todd | G06F 3/0482 715/853 |
| 2006/0173873 A1* | 8/2006 | Prompt | G06F 16/284 |
| 2008/0282189 A1* | 11/2008 | Hofmann | G06F 17/212 715/793 |
| 2009/0063415 A1 | 3/2009 | Chatfield et al. | |
| 2009/0100342 A1 | 4/2009 | Jakobson | |
| 2009/0177744 A1 | 7/2009 | Marlow et al. | |
| 2010/0269062 A1* | 10/2010 | Kobylinski | G06F 3/0485 715/781 |
| 2012/0030631 A1* | 2/2012 | Gonzalez | G06F 3/0482 715/854 |
| 2012/0166471 A1* | 6/2012 | Ramamurthy | G06F 16/168 707/769 |
| 2012/0233137 A1 | 9/2012 | Jakobson et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2014/0359537 A1 | 12/2014 | Jakobson et al. | |
| 2015/0007050 A1 | 1/2015 | Jakobson et al. | |
| 2015/0095162 A1 | 4/2015 | Jakobson et al. | |
| 2015/0172563 A1 | 6/2015 | Jakobson et al. | |
| 2016/0335303 A1* | 11/2016 | Madhalam | G06F 16/2455 |

* cited by examiner

ENABLING HIERARCHICAL STRUCTURE REPRESENTATION OF ENTITIES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to data processing and more specifically relates to representing entities using hierarchical structures.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

A Customer Relationship Management (CRM) system is a tool which helps with contact management, sales management, workflow processes, productivity and so on. A CRM system can help increasing leads, closing more deals, and improving customer loyalty and satisfaction. When the users of the CRM system are provided with tools to efficiently manage their CRM information, they can get the desired result sooner which may lead to more sales and improved productivity.

BRIEF SUMMARY

For some embodiments, methods for processing entities may include generating, by a computing system, a hierarchical structure representation of entities from a plurality of entities of an object; receiving, by the computing system, information about a current entity; displaying, by the computing system, the current entity and entities related to the current entity using the hierarchical structure representation of the entities, the displaying being based on a display range; and updating, by the computing system, the display of the current entity and the entities related to the current entity based on detecting a scrolling up action. Other aspects and advantages of the present invention can be seen on review of the drawings, the detailed description and the claims, which follow.

BRIEF DESCRIPTION OF THE DRAWINGS

The included drawings are for illustrative purposes and serve only to provide examples of possible structures and process steps for the disclosed techniques. These drawings in no way limit any changes in form and detail that may be made to embodiments by one skilled in the art without departing from the spirit and scope of the disclosure.

DETAILED DESCRIPTION

Figure 1A:
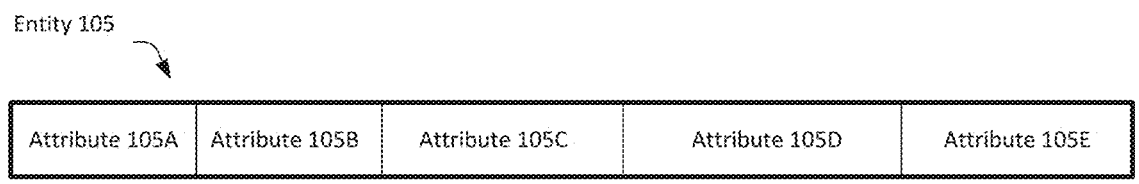
FIG. 1A shows a diagram of an example entity and its attributes that may be used with some embodiments.

Systems and methods for representing entities of an object using a hierarchical structure representation of the entities and processing a specified entity using the hierarchical structure representation are disclosed. A display range may be used to determine how the specified entity and its related entities may be displayed. Upon detecting a scroll up option on a graphical user interface, the display of the specified entity and its related entities may be updated to enable efficient viewing the specified entity and its related entities positioned at higher levels of the hierarchical structure.

The systems and methods will be described with reference to example embodiments. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific embodiments. Although these embodiments are described in sufficient detail to enable one skilled in the art to practice the disclosure, it is understood that these examples are not limiting, such that other embodiments may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more embodiments may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

The disclosed embodiments may include systems and methods for processing entities and include generating, by a computing system, a hierarchical structure representation of entities from a plurality of entities of an object; receiving, by the computing system, information about a current entity; displaying, by the computing system, the current entity and entities related to the current entity using the hierarchical structure representation of the entities, the displaying being based on a display range; and updating, by the computing system, the displaying of the current entity and the related entities based on detecting a scrolling up action on a graphical user interface associated with the computing system.

The disclosed embodiments may include an apparatus for processing entities and include a processor, and one or more stored sequences of instructions which, when executed by the processor, cause the processor to generate a hierarchical structure representation of entities from a plurality of entities of an object; receive information about a current entity; display the current entity and entities related to the current entity using the hierarchical structure representation of the entities, the displaying being based on a display range; and update the displaying of the current entity and the related entities based on detecting a scrolling up action on a graphical user interface.

The disclosed embodiments may include a computer program product comprising computer-readable program code to be executed by one or more processors when retrieved from a non-transitory computer-readable medium, the program code including instructions to generate a hierarchical structure representation of entities from a plurality of entities of an object; receive information about a current entity; display the current entity and entities related to the current entity using the hierarchical structure representation of the entities, the displaying being based on a display range; and update the displaying of the current entity and the entities related to the current entity based on detecting a scrolling up action on a graphical user interface.

While one or more implementations and techniques are described with reference to an embodiment in which entities associated with an object may be displayed based on a specified current entity is implemented in a system having an application server providing a front end for an on-demand database service capable of supporting multiple tenants, the one or more implementations and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. The one or more implementations encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

The described subject matter may be implemented in the context of any computer-implemented system, such as a software-based system, a database system, a multi-tenant environment, or the like. Moreover, the described subject matter may be implemented in connection with two or more separate and distinct computer-implemented systems that cooperate and communicate with one another. One or more implementations may be implemented in numerous ways, including as a process, an apparatus, a system, a device, a method, a computer readable medium such as a computer readable storage medium containing computer readable instructions or computer program code, or as a computer program product comprising a computer usable medium having a computer readable program code embodied therein.

FIG. 1A shows a diagram of an example entity and its attributes that may be used with some embodiments. In general, a CRM system may include multiple objects such as, for example, accounts, contacts, leads, opportunities, etc. A lead may be a person who can be linked to a potential business; a contact may be a known person working at a company; an account may be a company; and an opportunity may be a potential sale related to an account or a contact. Each object may be associated with thousands of records or entities such as, for example entity 105. An entity may include one or more attributes such as attributes 105A to 105E. Some examples of the attributes of an account entity may include account name, billing state and phone number.

Figure 1B:
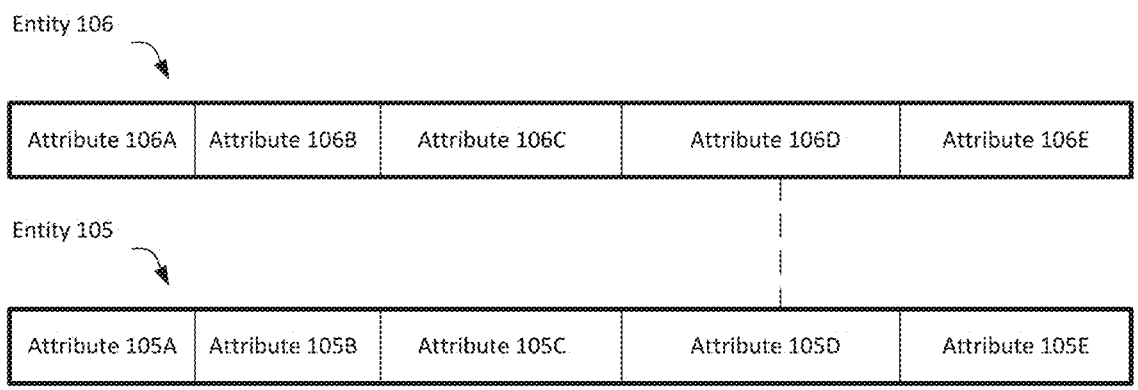
FIG. 1B shows a diagram of an example entity parent child relationship in accordance with some embodiments.

FIG. 1B shows a diagram of an example entity parent child relationship in accordance with some embodiments. An entity may be related to another entity based on parent child relationship. In this example, the entity 106 includes attributes 106A to 106E like the attributes of the entity 105 and is associated with the same object as the entity 105. The entity 106 may be a parent entity to the entity 105 based on the attributes 105D and 106D (shown in dotted lines). Different entities may use different attributes to represent the parent child relationship. For example, an account entity may include a parentID attribute and may use the parentId attribute to specify the parent child relationship with another account entity. As another example, a contact entity may include a reportToId attribute and may use this reportToId attribute to specify the parent child relationship with another contact entity. For some embodiments, the attribute used to specify the parent child relationship between entities may be customizable. For example, a user may specify a third attribute (attribute 105C of entity 105 and attribute 106C of entity 106) to be used for parent child relationship, and the CRM system may generate a hierarchical structure representing the entities based on such parent child relationship.

Figure 1C:
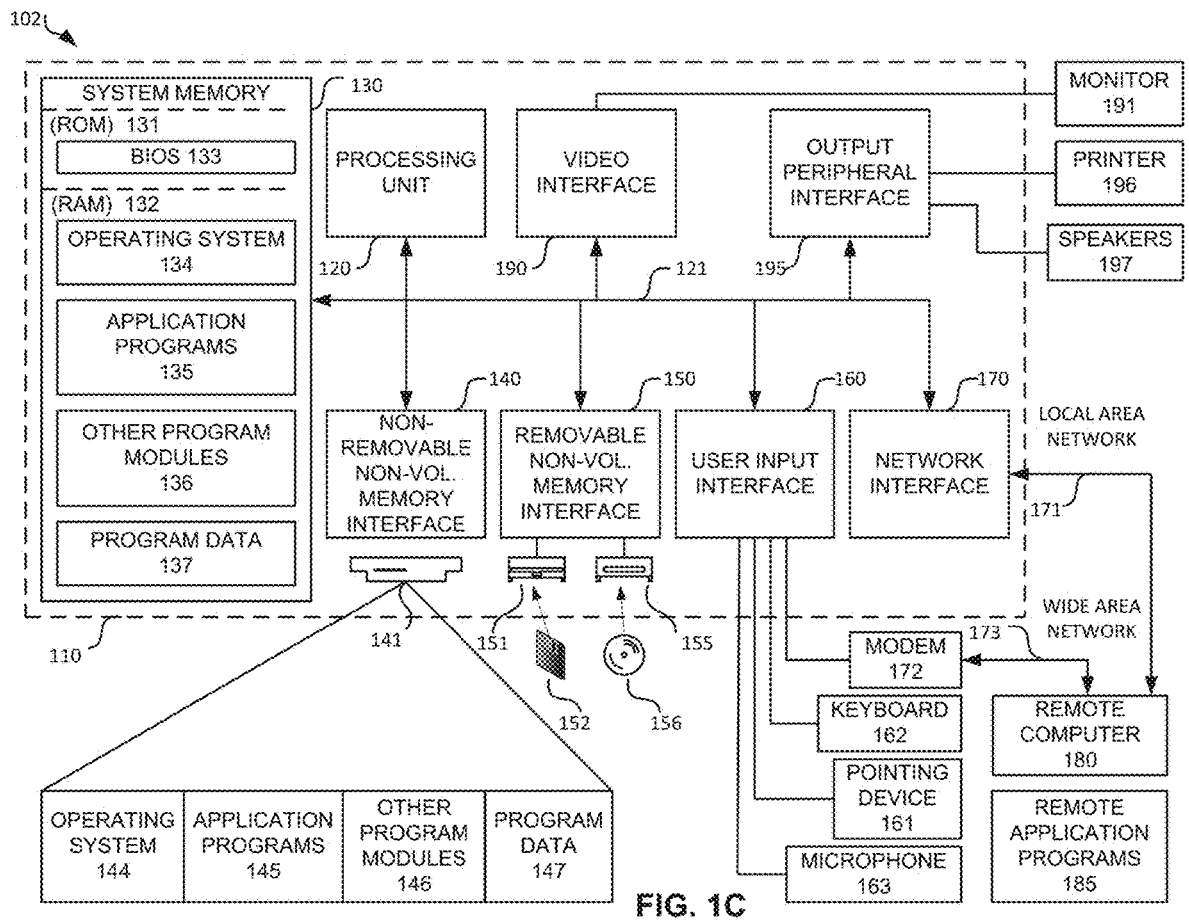
FIG. 1C shows a diagram of an example computing system that may be used with some embodiments.

FIG. 1C is a diagram of an example computing system that may be used with some embodiments of the present invention. The computing system 102 may be used by a user to view entities associated with an object via a user interface. The user interface may display the entities in a hierarchy based on the parent child relationship. The user interface may be associated with a computing system. For some embodiments, the computing system may be associated with a multi-tenant database environment. For example, the multi-tenant database environment may be associated with the services provided by Salesforce.com®.

The computing system 102 is only one example of a suitable computing system, such as a mobile computing system, and is not intended to suggest any limitation as to the scope of use or functionality of the design. Neither should the computing system 102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 102 may be implemented as a mobile computing system such as one that is configured to run with an operating system (e.g., iOS) developed by Apple Inc. of Cupertino, Calif. or an operating system (e.g., Android) that is developed by Google Inc. of Mountain View, Calif.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine program product discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 1, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer program product. Computer program product can be any available media that can be accessed by computing system 102 and includes both volatile and nonvolatile media, removable and non-removable media. By way of example, and not limitation, computer program product may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 1 also illustrates operating system 134, application programs 135, other program modules 136, and program data 137.

The computing system 102 may also include other removable/non-removable volatile/nonvolatile computer storage media. By way of example only, FIG. 1 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computing system 102. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touch pad or touch screen. Other input devices (not shown) may include a joystick, game pad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102. The logical connections depicted in FIG. 1 includes a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 1 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 1. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

Figure 2:
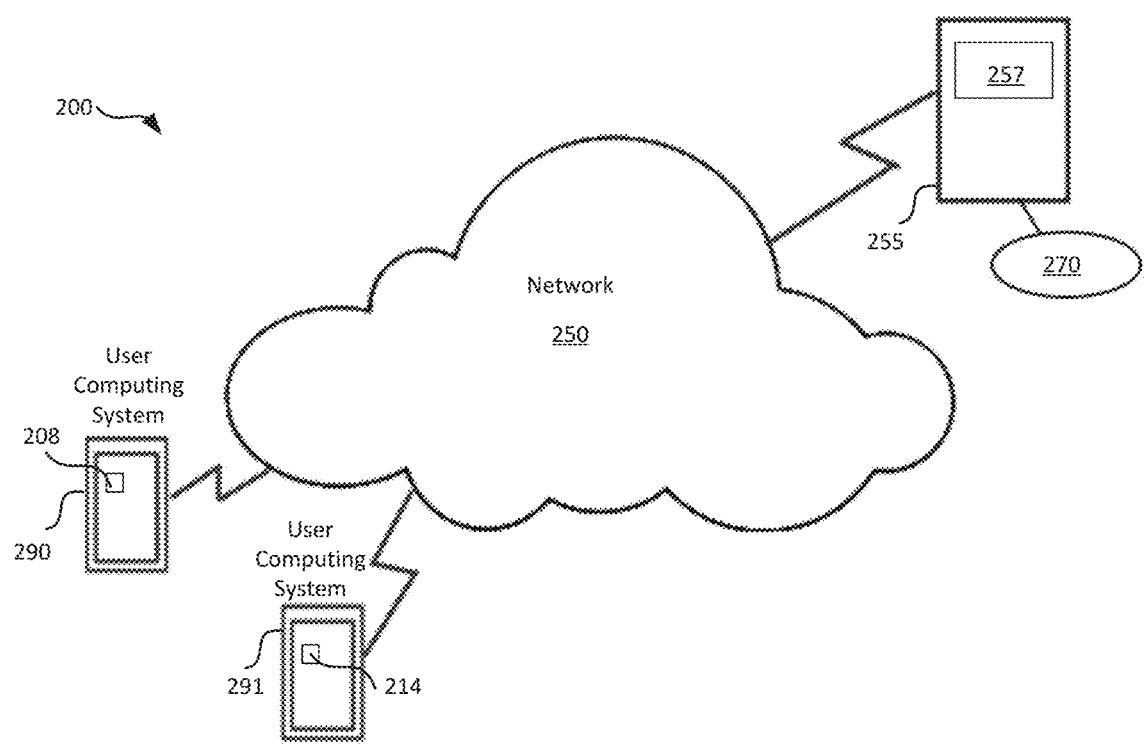
FIG. 2 shows a diagram of an example network environment that may be used with some embodiments.

FIG. 2 shows a diagram of an example network environment that may be used with some embodiments of the present invention. Network environment 200 includes computing systems 290 and 291. One or more of the computing systems 290 and 291 may be a mobile computing system. The computing systems 290 and 291 may be connected to the network 250 via a cellular connection or via a Wi-Fi router (not shown). The network 250 may be the Internet. The computing systems 290 and 291 may be coupled with computing system 255 via the network 250.

Each of the computing systems 290 and 291 may include a respective application module 208 and 214. A user may use the computing system 290 and the application module 208 to connect to and communicate with the computing system 255 and log into application 257 (e.g., a Salesforce.com® application). The computing system 255 may be associated with database 270. For example, a user may log into application 257 to view the entities in an object including how the entities are related to one another based on parent child relationship. A hierarchical structure representation of the entities may be stored in database 270.

Figure 3A:
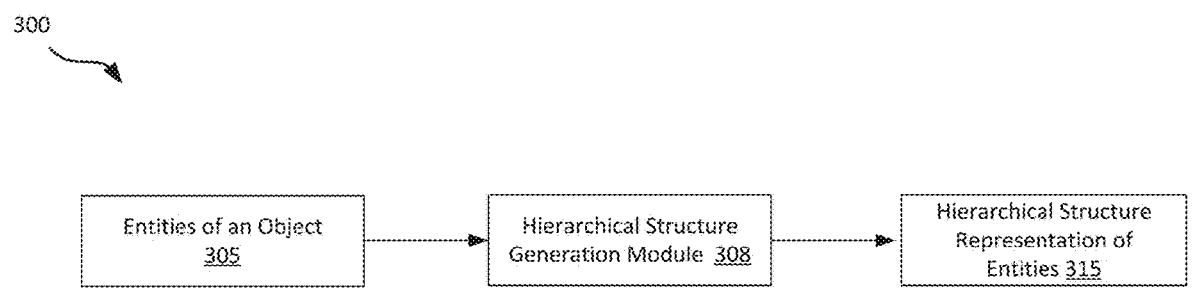
FIG. 3A shows a diagram of an example module that may be used to generate a hierarchical structure representation of entities, in accordance with some embodiments.

FIG. 3A shows an example diagram of a hierarchical structure generation module that may be used, in accordance with some embodiments. Diagram 300 includes hierarchical structure generation module 308 configured to generate a hierarchical structure representation of entities 315. The hierarchical structure generation module 308 may receive as its input entities of an object 305 and parent child relationship information 302. For example, the entities may be account entities of an account object. The entities may be stored in the database 270 (shown in FIG. 2), and the parent child relationship information 302 may specify an attribute in an entity to use for determining the parent child relationship, as described with FIG. 1B.

Figure 3B:
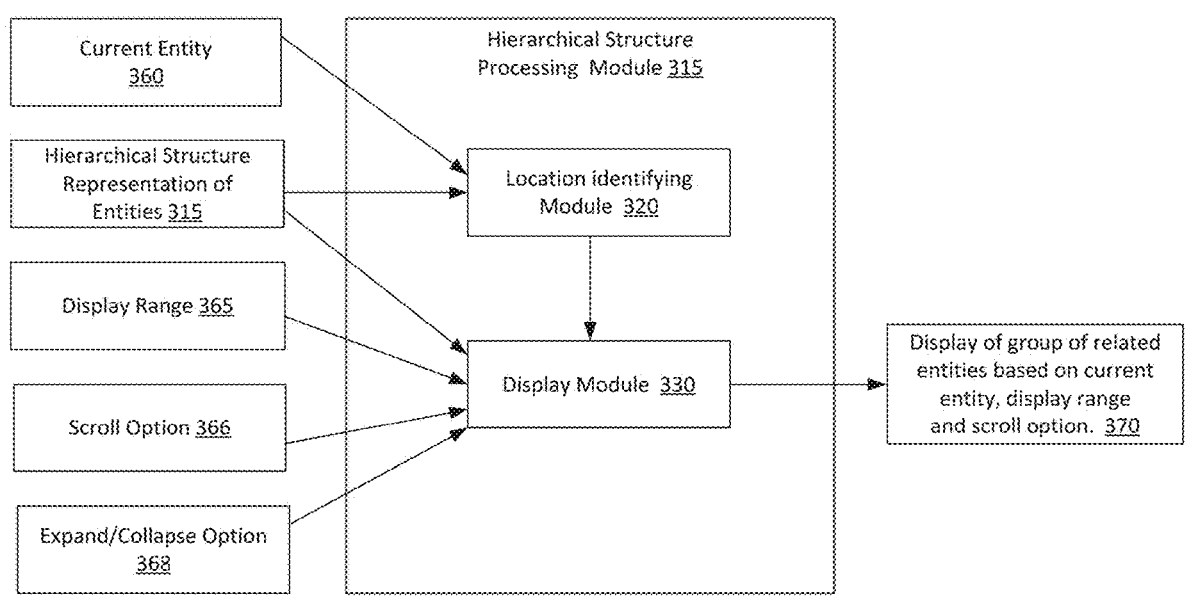
FIG. 3B shows an example diagram of a hierarchical structure processing module that may be used, in accordance with some embodiments.

FIG. 3B shows an example diagram of a hierarchical structure processing module that may be used, in accordance with some embodiments. Diagram 310 includes hierarchical structure processing module 305 configured to enable displaying the entities using the hierarchical structure representation of the entities 315. The hierarchical structure processing module 305 may be associated with the computing system 255.

The hierarchical structure processing module 305 may be configured to receive information about a current entity 360. For example, a user may navigate a user interface to an entity (also referred to as current entity or current node) and initiate a request to view a hierarchical structure representation of the current entity and its related entities. The hierarchical structure processing module 305 may include a location identifying module 320 configured to determine a location of the current entity in the hierarchical structure representation of the entities 315. The hierarchical structure processing module 305 may include a display module 330 configured to display the current entity with related entities 370 in the hierarchical structure based on a display range 365, scroll option 366 and expand/collapse option 368. The display range 365 may indicate how many of the entities in the hierarchical structure representation of the entities 315 to display. For example, when the display range is set at 100, then a group of 100 entities may be displayed.

The scroll option 366 may be used by a user to enable controlling the display of the current entity and its related entities up or down the hierarchy. For example, a user may select a scroll up option via the user interface to view related entities at higher levels (e.g., parent and grandparent levels) of the hierarchical structure representation of the entities 315. Similarly, the user may select a scroll down option via the user interface to view related entities at lower levels of the hierarchical structure representation of the entities 315. The expand/collapse option 368 may be applied to a specific entity. A user may use the expand/collapse option 368 to control the display of entities at the same or sibling level as the specific entity. For example, when an expand selection is detected, the display module 330 may display more entities at the same level of the specific entity. For some embodiments, when the expand selection is detected and the specific entity has children entities, the children entities may be displayed. For some embodiments, when an entity has already been expanded, expanding it again may cause the entities at the grandchildren level to be displayed if the grandchildren entities exist. When a collapse selection is detected, the display module 330 may display only the specific entity and not any entity at lower levels (e.g., its children entities and grandchildren entities). Using the display range 365, the scroll option 366 and expand/collapse and option 368 may make it easier and faster for a user to visualize the hierarchical structure of the current entity and its related entities.

Figure 4A:
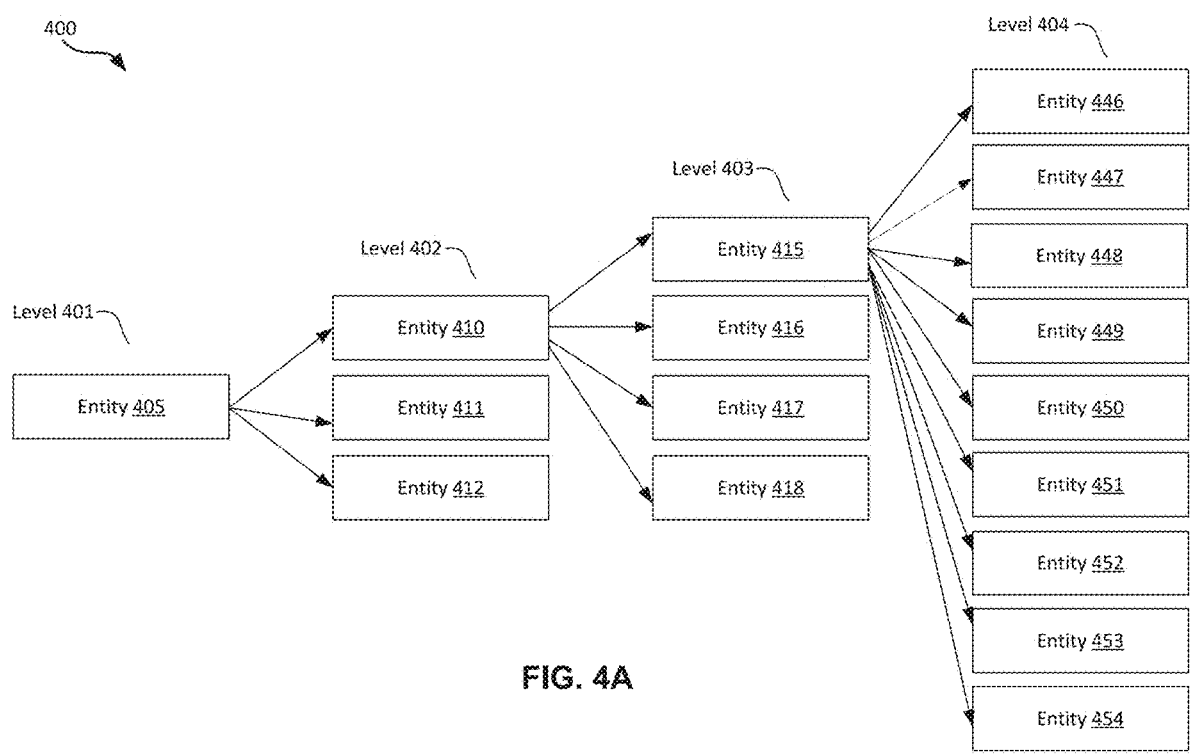
FIGS. 4A-4C show examples of hierarchical structure representation of the entities, in accordance with some embodiments.

FIG. 4A shows an example of a hierarchical structure representation of the entities, in accordance with some embodiments. Diagram 400 shows a group of entities 405 to 454 that may be positioned at different levels in the hierarchical structure representation of the entities 405 to 454. In this example, there may be four levels 401, 402, 403 and 404. The level 401 may be viewed as highest in the hierarchy, and the level 404 may be viewed as lowest in the hierarchy. The entities shown at the same level may be viewed as sibling entities. For example, the entities 446 to 454 may be viewed as sibling entities because they are positioned at the level 404.

Figure 4B:
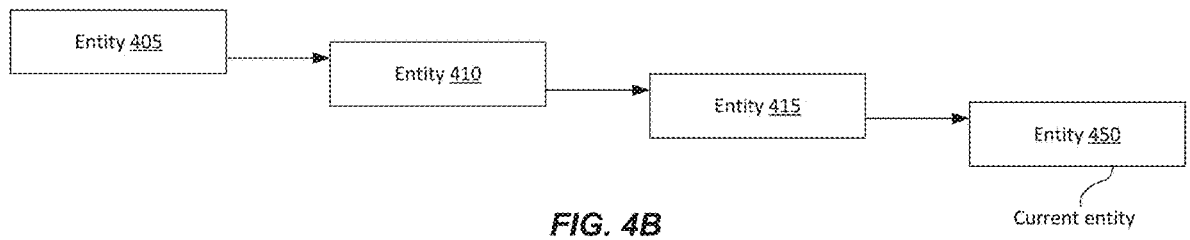
Figure 4C:
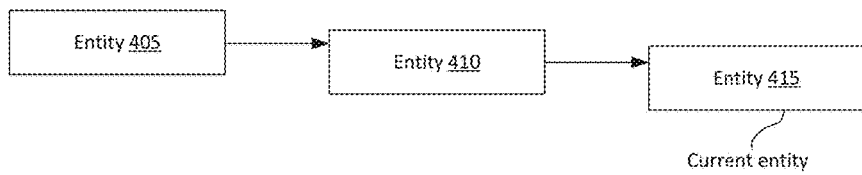

For some embodiments, a child entity may have only one parent entity; however, a parent entity may have one or more children entities. For example, the parent entity of the entity 450 is only the entity 415. However, the children entities of the entity 415 are the entities 446 to 454. There may be multiple instances of parent child relationship depending on which entity is selected as a current entity. Further, the number of entities that may be displayed by the display module 430 may vary depending on the which entity is selected as a current entity. For example, if the entity 450 is selected as a current entity, then the display module 430 may display a parent child relationship that includes the entities 450, 415, 410 and 405, as shown in FIG. 4B. However, if the entity 415 is selected as a current entity, then the display module 430 may display a parent child relationship that includes the entities 415, 410 and 405, as shown in FIG. 4C.

Figure 5A:
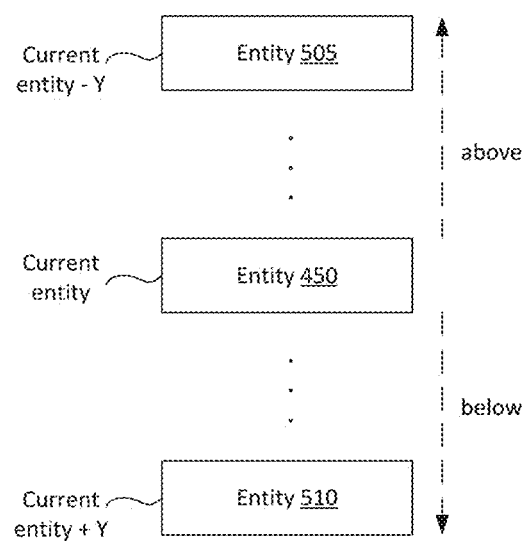
FIG. 5A is a diagram that shows an example of entities displayed by a display module using a display range, in accordance with some embodiments.

FIG. 5A is a diagram that shows an example of entities displayed by a display module using a display range, in accordance with some embodiments. For some embodiments, when the current entity is displayed with its related entities based on a display range (e.g., X), the display module 330 may be configured to display the current entity at or near the middle of the group such that approximately half of the related entities (e.g., Y=X/2) are displayed above the current entity and approximately the remaining half of the related entities are displayed below the current entity. In the current example, the display range may be set at 100, and the current entity may be the entity 450. The display module 330 may display the 100 entities with the entity 450 displayed at approximately the middle of the 100 entities. As another example, referring to FIG. 4A, if the display range is six (6), and the current entity is the entity 450, then the display module 330 may display the entities 447 to 453 with the entity 450 displayed approximately in the middle of the group. It may be noted that the entities 447 to 449 are positioned at the same level as the entity 450 but above the entity 450 in the hierarchical structure representation of the entities, and the entities 451 to 453 are positioned at the same level as the entity 450 but below the entity 450 in the hierarchical structure representation of the entities. The position of the entities 447 to 449 and 451 to 453 in the hierarchical structure representation of the entities may be used to determine how to display the entities above and below the entity 450.

For some embodiments, when displaying the related entities below a current entity, only sibling entities to the current entity may be displayed. That is, no entity at the children level of the current entity may be considered. Referring to FIG. 4A, when the current entity is the entity 416 and the display range is four (4), the display module 330 may display the entities 410 and 415 to 418, but none of the entities at the level 404. The reason for this is based on an expectation that a user of a CRM system may only be interested in the hierarchy above a current entity. For example, for a contact entity, a user may be more interested in knowing who the contact works with and who the contact reports to, but the user may be less interested in who works for the contact.

For some embodiments, when the number of entities at the sibling level is many more than the display range, the display module 330 may continue to display more sibling entities when the scroll up or scroll down option is detected. For example, referring to the example shown in FIG. 4A, when the display range is two (2) and the current entity is the entity 450, and a scroll up option is detected, the display module 330 may display the entities 449, 450 and 451. From there, when a scroll down option is detected, the display module 330 may display the entities 452, 453 and 454. However, if a scroll up option is instead detected, then the display module 330 may display the entities 446, 447 and 448.

For some embodiments, when the number of entities at the sibling level is less than the display range, the display module 330 may display additional entities at the higher levels. For example, referring to the example shown in FIG. 4A, when the display range is ten (10), and the current entity is the entity 450, then the display module 330 may display the entities 410, 415 and 446 to 454 because there are not sufficient number entities at the sibling level of the current entity 450 to satisfy the display range. As such, the entities at the higher levels (parent entity 415 and grandparent entity 410) may be considered.

For some embodiments, the display module 330 may display more entities at a higher level when there are not sufficient entities above or below the current entity to display. For example, if the current entity is the entity 417 at the level 403, and the display range is four (4), then the display module 330 may display two (4/2) entities above the entity 417 which are entities 415 and 416. When the display module 330 display two (2) entities below the entity 417, there is only one entity 418 to display. Thus, the display module 330 may make up for the missing entity by displaying entity 410 which is a parent entity of the entity 417. As another example, if the current entity is 417 and the display range is six (6), then the display module 330 may display three (6/2) entities above the entity 417. However, there are only two entities 415 and 416 above the entity at the level 403. As such, the display module 330 may display the entities 415, 416 and the entity 410 which is a parent entity of the entity 417. When the display module 330 display three (3) entities below the entity 417, there is only one entity 418 to display. Thus, the display module 330 may make up for the missing entity by displaying entity 410 which is a parent entity of the entity 417 and entity 405 which is a grandparent of the entity 417. However, since the parent entity 410 is already displayed, the display module 330 may not display the parent entity 410 twice. Since the entity 405 is positioned at the root of the hierarchical structure representation of the entities, no other entities can be considered except for the entity 405. As such, the display module 330 may display the entities 405, 410 and 415 to 418.

For some embodiments, when the expand/collapse option 368 is detected, the number of entities displayed by the display module 330 may be affected. For example, referring to FIG. 4A, when the current entity is the entity 450 and the display range is four (4), and if the expand option is applied to the entity 450, then the display module 330 may display the entities 448 to 452. However, if the collapse option is then applied to the entity 450, then the display module 433 may display the entities 405, 410, 415 and 450. It may be noted that only four (4) entities are displayed in this example because there is no other entity at a higher level than the entity 405 in the hierarchy. For some embodiments, a location of the current entity may be continuously maintained by the hierarchical structure processing module 305 (shown in FIG. 3) until a user selects a different entity as a current entity.

It may be noted that even though the description associated with FIG. 5A refer to using half of the display range to display related entities above and below the current entity, it may be viewed as using one portion of the number of related entities above the current entity and the remaining portion of the number of the related entities below the current entity.

Figure 5B:
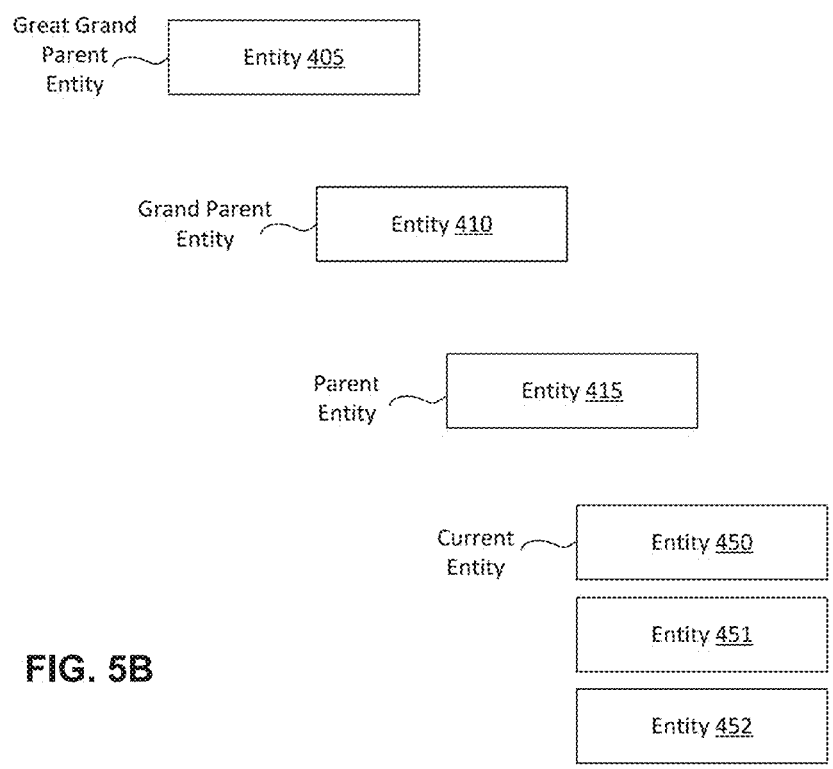
FIG. 5B is a diagram that shows an example of how the display module may display the entities at the higher levels of the hierarchical structure representation of the entities, in accordance with some embodiments.

FIG. 5B is a diagram that shows an example of how the display module may display the entities at the higher levels of the hierarchical structure representation of the entities, in accordance with some embodiments. In this example, the entity 450 is positioned at a lowest level, and the entity 405 is positioned at a highest level. For some embodiments, when displaying an entity at a higher level than another entity, the display module 330 may be configured to display the entity at the lower level by indenting it from the entity at the higher level. For example, the display module 330 may display the current entity 450 indented from its own parent entity 415, which may be displayed indented from its own parent entity 410, which may be displayed indented from its own parent entity 405. For some embodiments, when displaying an entity at the same level as the current entity, the display module 330 may be configured to display the entity at the same levels in the same column (or non-indented). For example, the display module 330 may display the entities 450, 451 and 452 in the same column.

Figure 6:
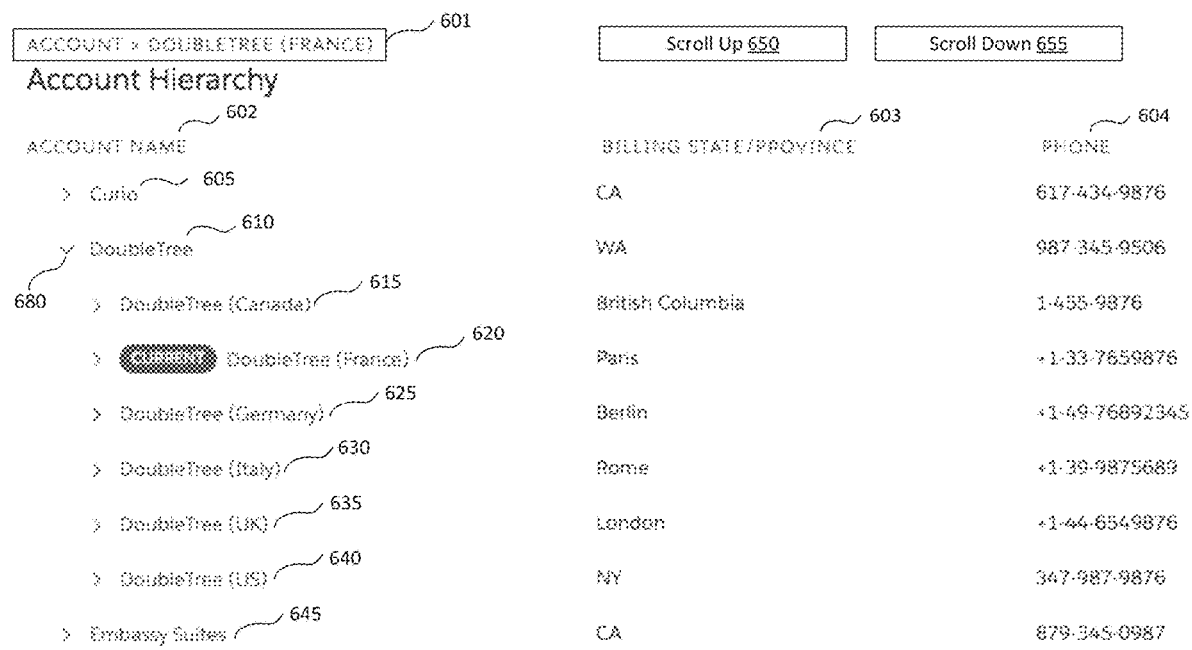
FIG. 6 is an example display screen of entities in a hierarchical structure representation of entities, in accordance with some embodiments.

FIG. 6 is an example display screen of entities in a hierarchical structure representation of entities, in accordance with some embodiments. In this example, the account object 603 includes many account entities. Each account entity is associated with the attributes 602, 603 and 604. The account object 603 includes account entities 605 to 645. The account entity 620 is shown as the current entity. The account entities 615 and 625 to 645 are considered as the siblings of the entity 620 and are shown in the same column (or non-indented) with one another. The account entities 605, 610 and 645 are considered as sibling entities and are shown in the same column. The account entity 610 is considered a parent entity of the account entities 615 to 640. A downward arrow or icon 680 associated with the account entity 610 is an example of an expansion option. For example, when the downward icon 680 is selected, the account entities 615 to 640 are displayed and visible. When the downward icon 680 is again selected (as in a toggle switch) to collapse the display, the account entities 615 to 640 may not be visible. Alternatively, there may be two separate icons—one for the expand option and one for the collapse option. The scroll up option 650 may be selected to scroll up the displayed information, and the scroll down option 655 may be selected to scroll down the displayed information.

As noted above, when the expand or collapse option is detected or when the scroll up or scroll down option is detected, the display module 330 may refresh the display screen to display fewer or more entities. It may be noted that, although the above description refers to the entities of an object, it may be possible to use entities from different objects to form a hierarchical structure representation of the entities. For example, a user may specify that an attribute associated with a first object and an attribute associated with a second object forms a parent child relationship.

Figure 7:
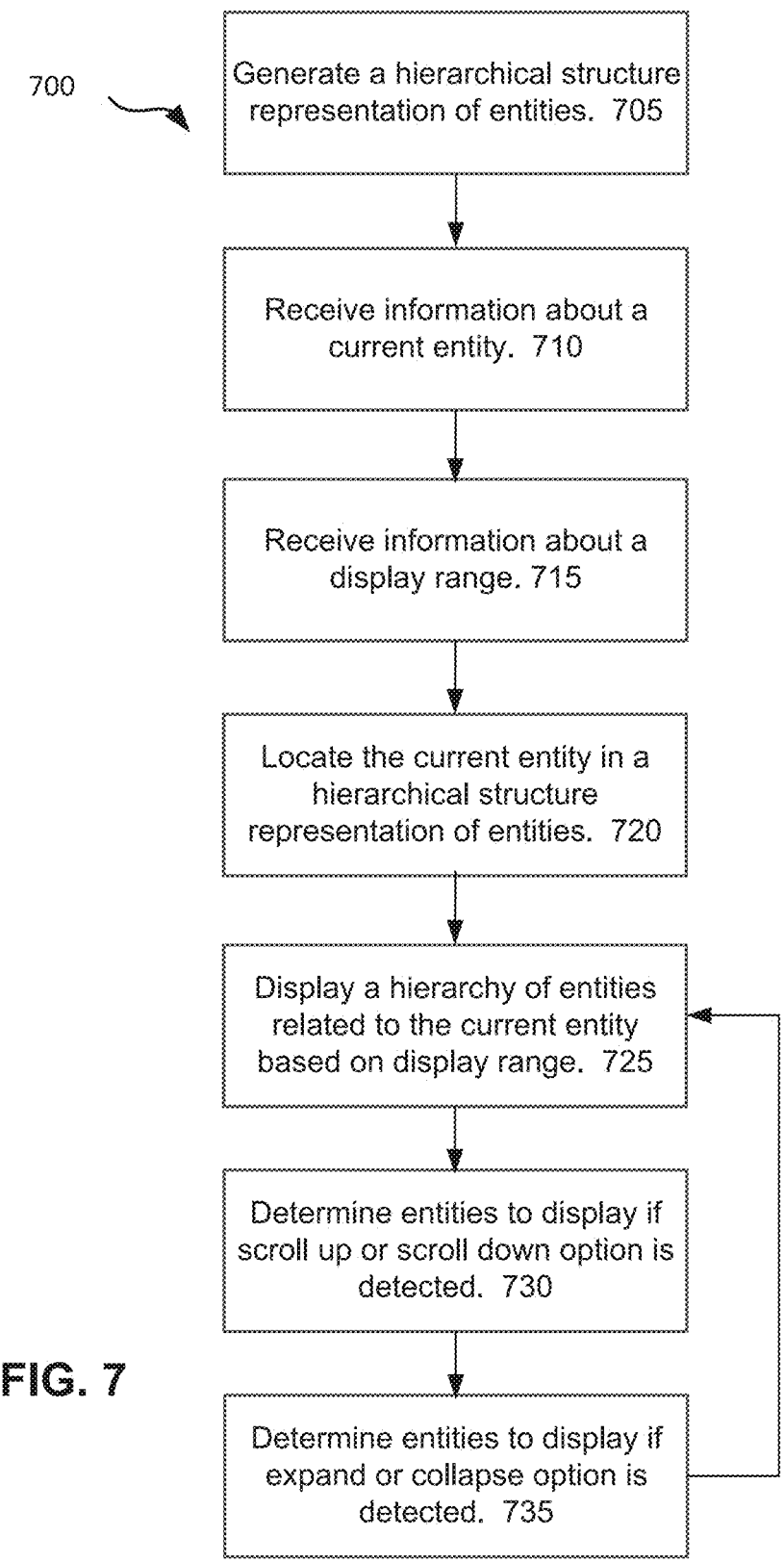
FIG. 7 shows a flowchart of an example process for processing the hierarchical structure representation of entities, in accordance with some embodiments.

FIG. 7 shows a flowchart of an example process for processing the hierarchical structure representation of entities, in accordance with some embodiments. The process 700 may be performed by a computing system such as the computing system 255 (shown in FIG. 2). For example, the process 700 may be performed by the hierarchical structure processing module 315 (shown in FIG. 3B). The entities of an object may be stored in the database 270. The process 700 may start at block 705 where a hierarchical structure representation of the entities may be generated, as described with FIG. 3A. At block 710, information about a current entity may be received. For example, the information may be received via a user interface that a user may use to specify a current entity. At block 715, information about a display range may be received. For example, the display range may indicate how many entities to display.

At block 720, a location of the current entity in the hierarchical structure representation of the entities may be identified. At block 725, a hierarchy of the current entity and its related entities may be displayed via a user interface based on the display range. As described above, the display module 330 may only display entities at the same level or at higher levels from a level associated with the current entity.

At block 730, it is determined whether a scroll up or scroll down option is detected. If either scrolling is detected, the hierarchical structure processing module 315 may determine the entities related to the current entity to reflect the scroll up or scroll down option. As described above, the scroll up option may cause entities at higher levels of the hierarchy from a position of the current entity to be displayed.

At block 735, it is determined whether an expand or collapse option is detected. If either of the expand or collapse option is detected, the hierarchical structure processing module 315 may determine the entities related to the current entity to reflect the expand or collapse option. As described above, the expand option may cause more entities at the same level as the affected entity to be displayed, and the collapse option may cause less entities at the same level as the affected entity to be displayed. The process may continue at block 725. Although not shown, the process 700 may end when the user logs out of the user interface or when there is a time out due to, for example, lack of activity.

Figure 8A:
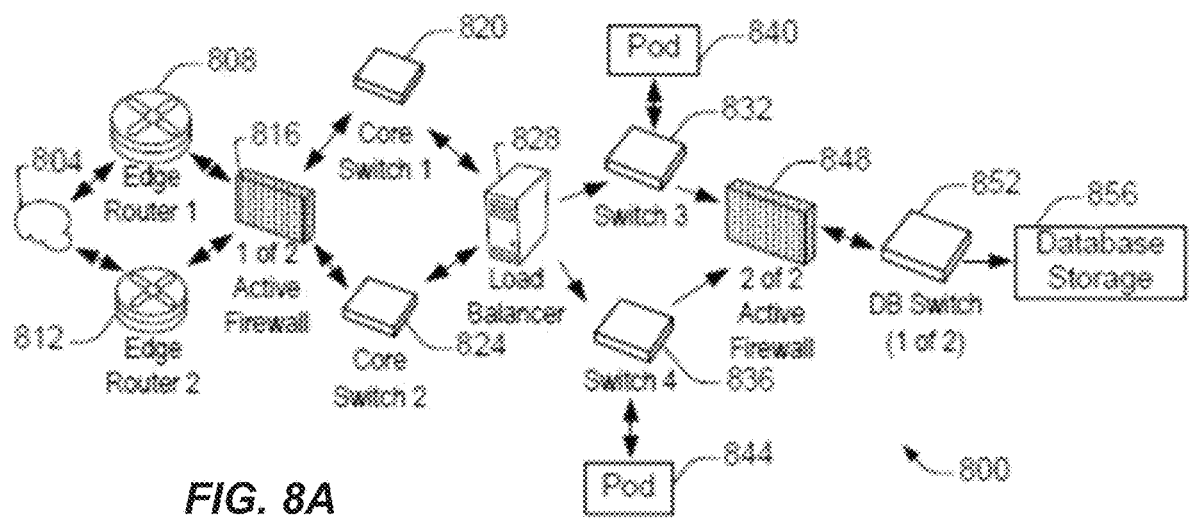
FIG. 8A shows a system diagram illustrating architectural components of an applicable environment, in accordance with some embodiments.

FIG. 8A shows a system diagram 800 illustrating architectural components of an on-demand service environment, in accordance with some embodiments. A client machine located in the cloud 804 (or Internet) may communicate with the on-demand service environment via one or more edge routers 808 and 812. The edge routers may communicate with one or more core switches 820 and 824 via firewall 816. The core switches may communicate with a load balancer 828, which may distribute server load over different pods, such as the pods 840 and 844. The pods 840 and 844, which may each include one or more servers and/or other computing resources, may perform data processing and other operations used to provide on-demand services. Communication with the pods may be conducted via pod switches 832 and 836. Components of the on-demand service environment may communicate with a database storage system 856 via a database firewall 848 and a database switch 852.

Figure 8B:
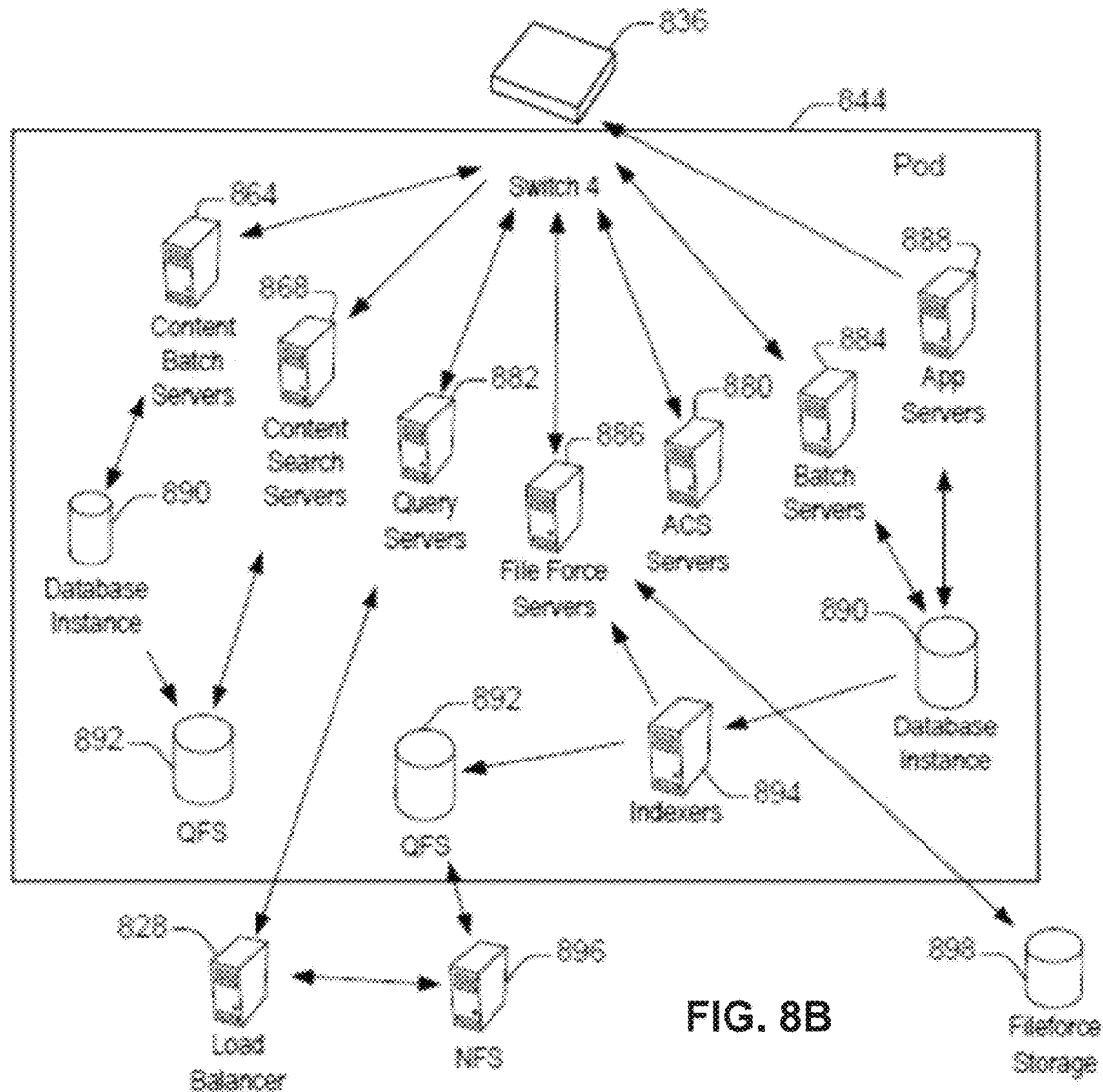
FIG. 8B shows a system diagram further illustrating architectural components of an applicable environment, in accordance with some embodiments.

As shown in FIGS. 8A and 8B, accessing an on-demand service environment may involve communications transmitted among a variety of different hardware and/or software components. Further, the on-demand service environment 800 is a simplified representation of an actual on-demand service environment. For example, while only one or two devices of each type are shown in FIGS. 8A and 8B, some embodiments of an on-demand service environment may include anywhere from one to many devices of each type. Also, the on-demand service environment need not include each device shown in FIGS. 8A and 8B, or may include additional devices not shown in FIGS. 8A and 8B.

Moreover, one or more of the devices in the on-demand service environment 800 may be implemented on the same physical device or on different hardware. Some devices may be implemented using hardware or a combination of hardware and software. Thus, terms such as "data processing apparatus," "machine," "server" and "device" as used herein are not limited to a single hardware device, but rather include any hardware and software configured to provide the described functionality.

The cloud 804 is intended to refer to a data network or plurality of data networks, often including the Internet. Client machines located in the cloud 804 may communicate with the on-demand service environment to access services provided by the on-demand service environment. For example, client machines may access the on-demand service environment to retrieve, store, edit, and/or process information.

In some embodiments, the edge routers 808 and 812 route packets between the cloud 804 and other components of the on-demand service environment 800. The edge routers 808 and 812 may employ the Border Gateway Protocol (BGP). The BGP is the core routing protocol of the Internet. The edge routers 808 and 812 may maintain a table of IP networks or 'prefixes' which designate network reachability among autonomous systems on the Internet.

In one or more embodiments, the firewall 816 may protect the inner components of the on-demand service environment 800 from Internet traffic. The firewall 816 may block, permit, or deny access to the inner components of the on-demand service environment 800 based upon a set of rules and other criteria. The firewall 816 may act as one or more of a packet filter, an application gateway, a stateful filter, a proxy server, or any other type of firewall.

In some embodiments, the core switches 820 and 824 are high-capacity switches that transfer packets within the on-demand service environment 800. The core switches 820 and 824 may be configured as network bridges that quickly route data between different components within the on-demand service environment. In some embodiments, the use of two or more core switches 820 and 824 may provide redundancy and/or reduced latency.

In some embodiments, the pods 840 and 844 may perform the core data processing and service functions provided by the on-demand service environment. Each pod may include various types of hardware and/or software computing resources. An example of the pod architecture is discussed in greater detail with reference to FIG. 8B.

In some embodiments, communication between the pods 840 and 844 may be conducted via the pod switches 832 and 836. The pod switches 832 and 836 may facilitate communication between the pods 840 and 844 and client machines located in the cloud 804, for example via core switches 820 and 824. Also, the pod switches 832 and 836 may facilitate communication between the pods 840 and 844 and the database storage 856.

In some embodiments, the load balancer 828 may distribute workload between the pods 840 and 844. Balancing the on-demand service requests between the pods may assist in improving the use of resources, increasing throughput, reducing response times, and/or reducing overhead. The load balancer 828 may include multilayer switches to analyze and forward traffic.

In some embodiments, access to the database storage 856 may be guarded by a database firewall 848. The database firewall 848 may act as a computer application firewall operating at the database application layer of a protocol stack. The database firewall 848 may protect the database storage 856 from application attacks such as structure query language (SQL) injection, database rootkits, and unauthorized information disclosure.

In some embodiments, the database firewall 848 may include a host using one or more forms of reverse proxy services to proxy traffic before passing it to a gateway router. The database firewall 848 may inspect the contents of database traffic and block certain content or database requests. The database firewall 848 may work on the SQL application level atop the TCP/IP stack, managing applications' connection to the database or SQL management interfaces as well as intercepting and enforcing packets traveling to or from a database network or application interface.

In some embodiments, communication with the database storage system 856 may be conducted via the database switch 852. The multi-tenant database system 856 may include more than one hardware and/or software components for handling database queries. Accordingly, the database switch 852 may direct database queries transmitted by other components of the on-demand service environment (e.g., the pods 840 and 844) to the correct components within the database storage system 856. In some embodiments, the database storage system 856 is an on-demand database system shared by many different organizations. The on-demand database system may employ a multi-tenant approach, a virtualized approach, or any other type of database approach. An on-demand database system is discussed in greater detail with reference to FIGS. 9 and 10.

FIG. 8B shows a system diagram illustrating the architecture of the pod 844, in accordance with one embodiment.

The pod 844 may be used to render services to a user of the on-demand service environment 800. In some embodiments, each pod may include a variety of servers and/or other systems. The pod 844 includes one or more content batch servers 864, content search servers 868, query servers 872, file force servers 876, access control system (ACS) servers 880, batch servers 884, and app servers 888. Also, the pod 844 includes database instances 890, quick file systems (QFS) 892, and indexers 894. In one or more embodiments, some or all communication between the servers in the pod 844 may be transmitted via the switch 836.

In some embodiments, the application servers 888 may include a hardware and/or software framework dedicated to the execution of procedures (e.g., programs, routines, scripts) for supporting the construction of applications provided by the on-demand service environment 800 via the pod 844. Some such procedures may include operations for providing the services described herein. The content batch servers 864 may requests internal to the pod. These requests may be long-running and/or not tied to a particular customer. For example, the content batch servers 864 may handle requests related to log mining, cleanup work, and maintenance tasks.

The content search servers 868 may provide query and indexer functions. For example, the functions provided by the content search servers 868 may allow users to search through content stored in the on-demand service environment. The Fileforce servers 876 may manage requests information stored in the Fileforce storage 878. The Fileforce storage 878 may store information such as documents, images, and basic large objects (BLOBs). By managing requests for information using the Fileforce servers 876, the image footprint on the database may be reduced.

The query servers 872 may be used to retrieve information from one or more file systems. For example, the query system 872 may receive requests for information from the app servers 888 and then transmit information queries to the NFS 896 located outside the pod. The pod 844 may share a database instance 890 configured as a multi-tenant environment in which different organizations share access to the same database. Additionally, services rendered by the pod 844 may require various hardware and/or software resources. In some embodiments, the ACS servers 880 may control access to data, hardware resources, or software resources.

In some embodiments, the batch servers 884 may process batch jobs, which are used to run tasks at specified times. Thus, the batch servers 884 may transmit instructions to other servers, such as the app servers 888, to trigger the batch jobs. For some embodiments, the QFS 892 may be an open source file system available from Sun Microsystems® of Santa Clara, Calif. The QFS may serve as a rapid-access file system for storing and accessing information available within the pod 844. The QFS 892 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 868 and/or indexers 894 to identify, retrieve, move, and/or update data stored in the network file systems 896 and/or other storage systems.

In some embodiments, one or more query servers 872 may communicate with the NFS 896 to retrieve and/or update information stored outside of the pod 844. The NFS 896 may allow servers located in the pod 844 to access information to access files over a network in a manner similar to how local storage is accessed. In some embodiments, queries from the query servers 822 may be transmitted to the NFS 896 via the load balancer 820, which may distribute resource requests over various resources available in the on-demand service environment. The NFS 896 may also communicate with the QFS 892 to update the information stored on the NFS 896 and/or to provide information to the QFS 892 for use by servers located within the pod 844.

In some embodiments, the pod may include one or more database instances 890. The database instance 890 may transmit information to the QFS 892. When information is transmitted to the QFS, it may be available for use by servers within the pod 844 without requiring an additional database call. In some embodiments, database information may be transmitted to the indexer 894. Indexer 894 may provide an index of information available in the database 890 and/or QFS 892. The index information may be provided to file force servers 876 and/or the QFS 892.

Figure 9:
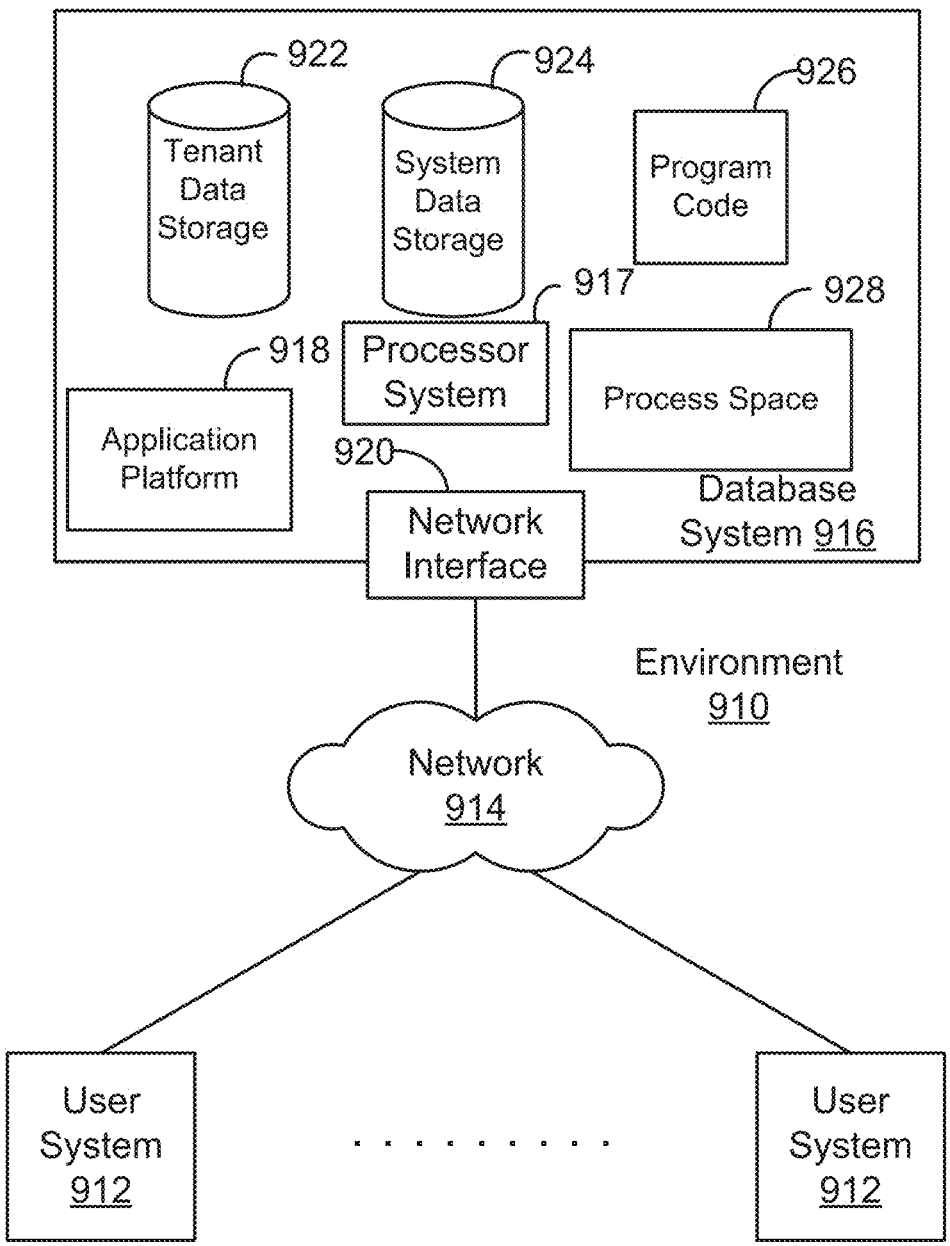
FIG. 9 shows a system diagram illustrating the architecture of a multi-tenant database environment, in accordance with some embodiments.
Figure 10:
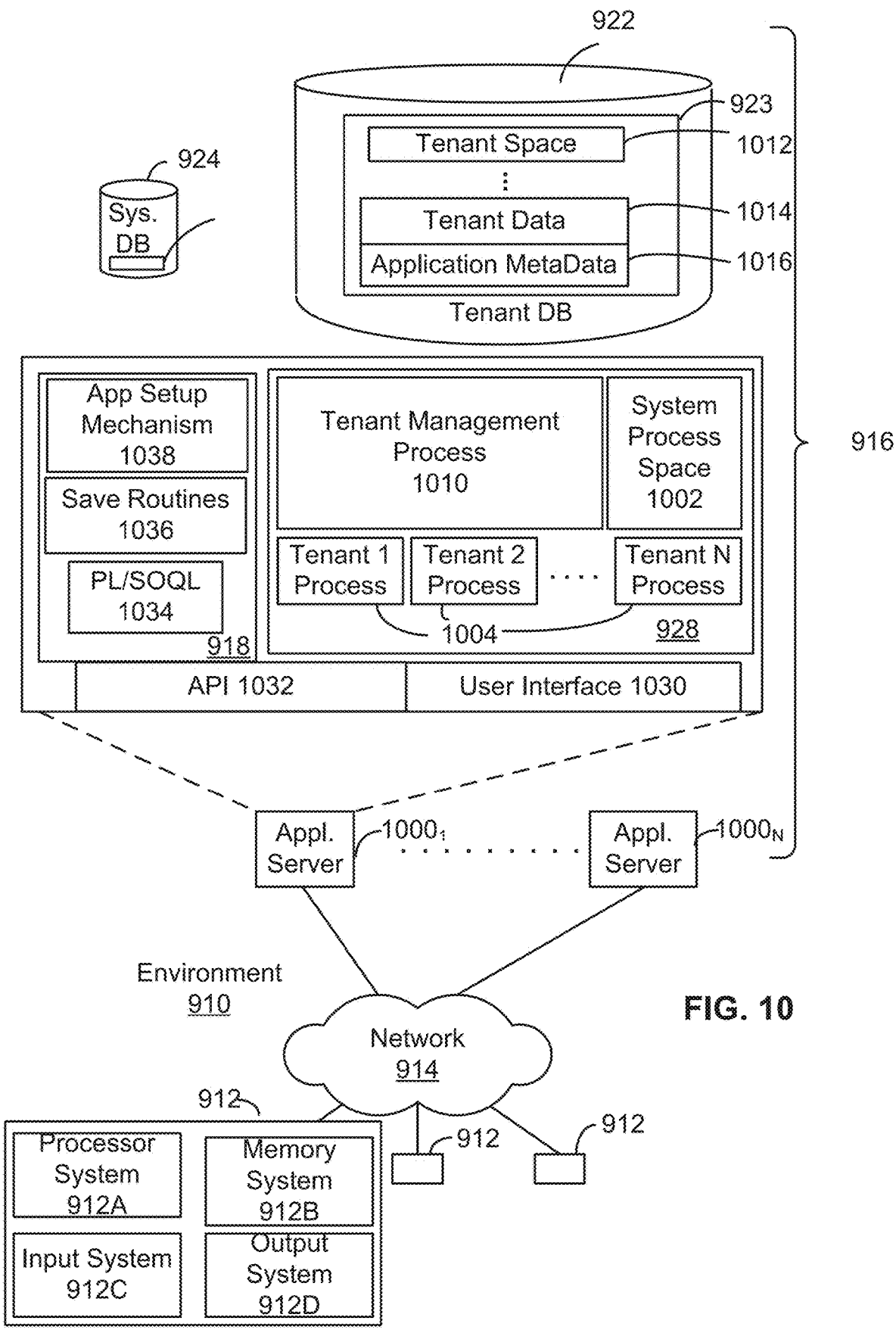
FIG. 10 shows a system diagram further illustrating the architecture of a multi-tenant database environment, in accordance with some embodiments.

FIG. 9 shows a block diagram of an environment 910 wherein an on-demand database service might be used, in accordance with some embodiments. Environment 910 includes an on-demand database service 916. User system 912 may be any machine or system that is used by a user to access a database user system. For example, any of user systems 912 can be a handheld computing system, a mobile phone, a laptop computer, a work station, and/or a network of computing systems. As illustrated in FIGS. 9 and 10, user systems 912 might interact via a network 914 with the on-demand database service 916.

An on-demand database service, such as system 916, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 916" and "system 916" will be used interchangeably herein. A database image may include one or more database objects. A relational database management system (RDBMS) or the equivalent may execute storage and retrieval of information against the database object(s). Application platform 918 may be a framework that allows the applications of system 916 to run, such as the hardware and/or software, e.g., the operating system. In an implementation, on-demand database service 916 may include an application platform 918 that enables creation, managing and executing one or more applications developed by the provider of the on-demand database service, users accessing the on-demand database service via user systems 912, or third party application developers accessing the on-demand database service via user systems 912.

One arrangement for elements of system 916 is shown in FIG. 9, including a network interface 920, application platform 918, tenant data storage 922 for tenant data 923, system data storage 924 for system data 925 accessible to system 916 and possibly multiple tenants, program code 926 for implementing various functions of system 916, and a process space 928 for executing MTS system processes and tenant-specific processes, such as running applications as part of an application hosting service. Additional processes that may execute on system 916 include database indexing processes.

The users of user systems 912 may differ in their respective capacities, and the capacity of a particular user system 912 might be entirely determined by permissions (permission levels) for the current user. For example, where a call center agent is using a particular user system 912 to interact with system 916, the user system 912 has the capacities allotted to that call center agent. However, while an administrator is using that user system to interact with system 916, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 914 is any network or combination of networks of devices that communicate with one another. For example, network 914 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some embodiments are not so limited, although TCP/IP is a frequently implemented protocol.

User systems 912 might communicate with system 916 using TCP/IP and, at a higher network level, use other common Internet protocols to communicate, such as HTTP, FTP, AFS, WAP, etc. In an example where HTTP is used, user system 912 might include an HTTP client commonly referred to as a "browser" for sending and receiving HTTP messages to and from an HTTP server at system 916. Such an HTTP server might be implemented as the sole network interface between system 916 and network 914, but other techniques might be used as well or instead. In some embodiments, the interface between system 916 and network 914 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In some embodiments, system 916, shown in FIG. 9, implements a web-based customer relationship management (CRM) system. For example, in some embodiments, system 916 includes application servers configured to implement and execute CRM software applications as well as provide related data, code, forms, web pages and other information to and from user systems 912 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 916 implements applications other than, or in addition to, a CRM application. For example, system 916 may provide tenant access to multiple hosted (standard and custom) applications. User (or third party developer) applications, which may or may not include CRM, may be supported by the application platform 918, which manages creation, storage of the applications into one or more database objects and executing of the applications in a virtual machine in the process space of the system 916.

Each user system 912 could include a desktop personal computer, workstation, laptop, PDA, cell phone, or any wireless access protocol (WAP) enabled device or any other computing system capable of interfacing directly or indirectly to the Internet or other network connection. User system 912 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 912 to access, process and view information, pages and applications available to it from system 916 over network 914.

Each user system 912 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 916 or other systems or servers. For example, the user interface device can be used to access data and applications hosted by system 916, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to some embodiments, each user system 912 and all of its components are operator configurable using applications, such as a browser, including computer code run using a central processing unit such as an Intel Pentium® processor or the like. Similarly, system 916 (and additional instances of an MTS, where more than one is present) and all of their components might be operator configurable using application(s) including computer code to run using a central processing unit such as processor system 917, which may include an Intel Pentium® processor or the like, and/or multiple processor units.

A computer program product implementation includes a machine-readable storage medium (media) having instructions stored thereon/in which can be used to program a computer to perform any of the processes of the embodiments described herein. Computer code for operating and configuring system 916 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing embodiments can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to some embodiments, each system 916 is configured to provide web pages, forms, applications, data and media content to user (client) systems 912 to support the access by user systems 912 as tenants of system 916. As such, system 916 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computing system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 10 also shows a block diagram of environment 910 further illustrating system 916 and various interconnections, in accordance with some embodiments. FIG. 10 shows that user system 912 may include processor system 912A, memory system 912B, input system 912C, and output system 912D. FIG. 10 shows network 914 and system 916. FIG. 10 also shows that system 916 may include tenant data storage 922, tenant data 923, system data storage 924, system data 925, User Interface (UI) 1030, Application Program Interface (API) 1032, PL/SOQL 1034, save routines 1036, application setup mechanism 1038, applications servers 10001-1000N, system process space 1002, tenant process spaces 1004, tenant management process space 1010, tenant storage area 1012, user storage 1014, and application metadata 1016. In other embodiments, environment 910 may not have the same elements as those listed above and/or may have other elements instead of, or in addition to, those listed above.

User system 912, network 914, system 916, tenant data storage 922, and system data storage 924 were discussed above in FIG. 9. Regarding user system 912, processor system 912A may be any combination of processors. Memory system 912B may be any combination of one or more memory devices, short term, and/or long term memory. Input system 912C may be any combination of input devices, such as keyboards, mice, trackballs, scanners, cameras, and/or interfaces to networks. Output system 912D may be any combination of output devices, such as monitors, printers, and/or interfaces to networks. As shown by FIG. 10, system 916 may include a network interface 920 (of FIG. 9) implemented as a set of HTTP application servers 1000, an application platform 918, tenant data storage 922, and system data storage 924. Also shown is system process space 1002, including individual tenant process spaces 1004 and a tenant management process space 1010. Each application server 1000 may be configured to tenant data storage 922 and the tenant data 923 therein, and system data storage 924 and the system data 925 therein to serve requests of user systems 912. The tenant data 923 might be divided into individual tenant storage areas 1012, which can be either a physical arrangement and/or a logical arrangement of data. Within each tenant storage area 1012, user storage 1014 and application metadata 1016 might be similarly allocated for each user. For example, a copy of a user's most recently used (MRU) items might be stored to user storage 1014. Similarly, a copy of MRU items for an entire organization that is a tenant might be stored to tenant storage area 1012. A UI 1030 provides a user interface and an API 1032 provides an application programmer interface to system 916 resident processes to users and/or developers at user systems 912. The tenant data and the system data may be stored in various databases, such as Oracle™ databases.

Application platform 918 includes an application setup mechanism 1038 that supports application developers' creation and management of applications, which may be saved as metadata into tenant data storage 922 by save routines 1036 for execution by subscribers as tenant process spaces 1004 managed by tenant management process 1010 for example. Invocations to such applications may be coded using PL/SOQL 34 that provides a programming language style interface extension to API 1032. A detailed description of some PL/SOQL language embodiments is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 4007, which is hereby incorporated by reference in its entirety and for all purposes. Invocations to applications may be detected by system processes, which manage retrieving application metadata 1016 for the subscriber making the invocation and executing the metadata as an application in a virtual machine.

Each application server 1000 may be communicably coupled to database systems, e.g., having access to system data 925 and tenant data 923, via a different network connection. For example, one application server 10001 might be coupled via the network 914 (e.g., the Internet), another application server 1000N-1 might be coupled via a direct network link, and another application server 1000N might be coupled by yet a different network connection. Transfer Control Protocol and Internet Protocol (TCP/IP) are typical protocols for communicating between application servers 1000 and the database system. However, other transport protocols may be used to optimize the system depending on the network interconnect used.

In certain embodiments, each application server 1000 is configured to handle requests for any user associated with any organization that is a tenant. Because it is desirable to be able to add and remove application servers from the server pool at any time for any reason, there is preferably no server affinity for a user and/or organization to a specific application server 1000. In some embodiments, therefore, an interface system implementing a load balancing function (e.g., an F5 Big-IP load balancer) is communicably coupled between the application servers 1000 and the user systems 912 to distribute requests to the application servers 1000. In some embodiments, the load balancer uses a least connections algorithm to route user requests to the application servers

1000. Other examples of load balancing algorithms, such as round robin and observed response time, also can be used. For example, in certain embodiments, three consecutive requests from the same user could hit three different application servers 1000, and three requests from different users could hit the same application server 1000. In this manner, system 916 is multi-tenant, wherein system 916 handles storage of, and access to, different objects, data and applications across disparate users and organizations.

As an example of storage, one tenant might be a company that employs a sales force where each call center agent uses system 916 to manage their sales process. Thus, a user might maintain contact data, leads data, customer follow-up data, performance data, goals and progress data, etc., all applicable to that user's personal sales process (e.g., in tenant data storage 922). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 916 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 916 might also maintain system level data usable by multiple tenants or other data. Such system level data might include industry reports, news, postings, and the like that are sharable among tenants.

In certain embodiments, user systems 912 (which may be client machines/systems) communicate with application servers 1000 to request and update system-level and tenant-level data from system 916 that may require sending one or more queries to tenant data storage 922 and/or system data storage 924. System 916 (e.g., an application server 1000 in system 916) automatically generates one or more SQL statements (e.g., SQL queries) that are designed to access the desired information. System data storage 924 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some embodiments. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some embodiments, for example, all custom entity data rows are stored in a single multi-tenant physical table, which may contain multiple logical tables per organization. In some embodiments, multiple "tables" for a single customer may actually be stored in one large table and/or in the same table as the data of other customers.

These and other aspects of the disclosure may be implemented by various types of hardware, software, firmware, etc. For example, some features of the disclosure may be implemented, at least in part, by machine-program product that include program instructions, state information, etc., for performing various operations described herein. Examples of program instructions include both machine code, such as produced by a compiler, and files containing higher-level code that may be executed by the computer using an interpreter. Examples of machine-program product include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more embodiments and techniques are described with reference to an implementation in which a service cloud console is implemented in a system having an application server providing a front end for an on-demand database service capable of supporting multiple tenants, the one or more embodiments and techniques are not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While various embodiments have been described herein, it should be understood that they have been presented by way of example only, and not limitation. Thus, the breadth and scope of the present application should not be limited by any of the embodiments described herein, but should be defined only in accordance with the following and later-submitted claims and their equivalents.

What is claimed is:

1. A computer-generated method for processing entities, the method comprising:
generating, by a computing system, a hierarchical structure representation of a plurality of entities of an object;
receiving, by the computing system, information specifying a current entity of the plurality of entities;
determining, by the computing system, a location of the specified current entity in the hierarchical structure representation of the plurality of entities;
identifying, by the computing system, entities related to the current entity from the location of the current entity in the hierarchical structure representation and in response to receiving information specifying the current entity;
causing, by the computing system, the current entity and a portion of the identified related entities to be displayed on a graphical user interface (GUI), the total number of entities in the portion of the identified related entities being less than all of the identified related entities and being a predetermined number of entities to be displayed on the GUI corresponding to a display range; and
updating, by the computing system, the display on the graphical user interface in response to detecting a scrolling up action, the updating comprising:
causing at least one additional identified related entity not in the portion of the identified related entities to be displayed on the graphical user interface, the at least one additional identified related entity having a higher hierarchical position relative to the current entity, such that a total number of related entities displayed on the graphical user interface does not exceed the predetermined number; and
changing the relative position of the current entity within the graphical user interface to reflect the higher hierarchical position of the at least one additional related entity.

2. The method of claim 1, wherein the hierarchical structure representation of the entities is generated based on a parent child relationship of a first entity relative to a second entity in the plurality of entities.

3. The method of claim 2, wherein an entity in the plurality of entities includes at least one attribute, and wherein the parent child relationship of the first entity relative to the second entity is defined as a relationship between an attribute of the first entity and an attribute of the second entity.

4. The method of claim 1, wherein displaying the related entities comprises displaying one or more of a sibling entity of the current entity and an entity at a level higher than a level of the current entity, the entity at the higher level associated with the current entity via the parent child relationship.

5. The method of claim 4, wherein displaying the related entities comprises displaying one portion of the number of related entities above the current entity and displaying a remaining portion of the number of related entities below the current entity.

6. The method of claim 5, wherein displaying the remaining portion of the number of the related entities below the current entity comprises displaying no child entity of the current entity and no repeat displaying of an entity already displayed above the current entity.

7. The method of claim 6, wherein updating the display of the current entity and related entities based on detecting the scrolling up action comprises displaying additional entities related to the current entity in an indented format, the additional entities including one or more of a sibling entity of the current entity and an entity at a level higher than a level of the current entity in the hierarchical structure representation of the entities, the entity at the higher level associated with the current entity via the parent-child relationship.

8. The method of claim 7, wherein a position of the current entity is maintained until information about a different current entity is received.

9. The method of claim 8, further comprising updating, by the computing system, the display of the current entity and the related entities based on detecting a scrolling down action, an expand option or a collapse action on the graphical user interface.

10. The method of claim 9, wherein the scrolling down option causes displaying of additional sibling entities of the current entity.

11. The method of claim 10, wherein the expand option and the collapse action affects the current entity or one of the entities related to the current entity, the expand option causing displaying of at least one child entity of an affected entity, the collapse option causing no displaying of any child entity of the affected entity.

12. An apparatus comprising:
one or more processors; and
a non-transitory computer readable medium storing a plurality of instructions, which when executed, cause the one or more processors to:
generate a hierarchical structure representation of a plurality of entities of an object;
receiving information specifying a current entity of the plurality of entities;
determine a location of the specified current entity in the hierarchical structure representation of the plurality of entities;
identify entities related to the current entity from the location of the current entity in the hierarchical structure representation and in response to receiving information specifying the current entity;
cause the current entity and a portion of the identified related entities to be displayed on a graphical user interface (GUI), the total number of entities in the portion of the identified related entities being less than all of the identified related entities and being a predetermined number of entities to be displayed on the GUI corresponding to a display range; and
update the display on the graphical user interface in response to detecting a scrolling up action, the updating comprising:
causing at least one additional identified related entity not in the portion of the identified related entities to be displayed on the graphical user interface, the at least one additional identified related entity having a higher hierarchical position relative to the current entity, such that a total number of related entities displayed on the graphical user interface does not exceed the predetermined number; and
changing the relative position of the current entity within the graphical user interface to reflect the higher hierarchical position of the at least one additional related entity.

13. The apparatus of claim 12, wherein the hierarchical structure representation of the entities is generated based on a parent child relationship of a first entity relative to a second entity in the plurality of entities.

14. The apparatus of claim 13, wherein an entity in the plurality of entities includes at least one attribute, and wherein the parent child relationship of the first entity relative to the second entity is defined as a relationship between an attribute of the first entity and an attribute of the second entity.

15. The apparatus of claim 12, wherein the instructions to display the related entities comprises instructions to display one or more of a sibling entity of the current entity and an entity at a level higher than a level of the current entity, the entity at the higher level associated with the current entity via the parent child relationship.

16. The apparatus of claim 15, wherein the instructions to display the related entities comprises instructions to display one portion of the number of related entities above the current entity and instructions to display a remaining portion of the number of related entities below the current entity.

17. The apparatus of claim 16, wherein the instructions to display the remaining portion of the number of related entities below the current entity comprises instructions to display no child entity of the current entity and no repeat displaying of an entity already displayed above the current entity.

18. The apparatus of claim 17, wherein updating the display of the current entity and related entities based on detecting the scrolling up action comprises displaying additional entities related to the current entity in an indented format, the additional entities including one or more of a sibling entity of the current entity and an entity at a level higher than a level of the current entity in the hierarchical structure representation of the entities, the entity at the higher level associated with the current entity via the parent-child relationship.

19. The apparatus of claim 18, wherein a position of the current entity is maintained until information about a different current entity is received.

20. The apparatus of claim 19, further comprising instructions to update the display of the current entity and the related entities based on detecting a scrolling down action, an expand option or a collapse action on the graphical user interface.

21. The apparatus of claim 20, wherein the scrolling down option causes displaying of additional sibling entities of the current entity.

22. The apparatus of claim 21, wherein the expand option and the collapse action affect the current entity or one of the related entities, the expand option causing the display of at least one child entity of an affected entity, the collapse option causing no child entity of the affected entity to be displayed.

23. A computer program product comprising a non-transitory computer-readable medium having a computer-readable program code embodied therein to be executed by one or more processors, the program code including instructions to:
generate a hierarchical structure representation of a plurality of entities of an object;
receiving information specifying a current entity of the plurality of entities;
determine a location of the specified current entity in the hierarchical structure representation of the plurality of entities;
identify entities related to the current entity from the location of the current entity in the hierarchical structure representation and in response to receiving information specifying the current entity;
cause the current entity and a portion of the identified related entities to be displayed on a graphical user interface (GUI), the total number of entities in the portion of the identified related entities being based on the display range being less than all of the identified related entities and being a predetermined number of entities to be displayed on the GUI corresponding to a display range; and
update the display on the graphical user interface in response to detecting a scrolling up action, the updating comprising:
causing at least one additional identified related entity not in the portion of the identified related entities to be displayed on the graphical user interface, the at least one additional identified related entity having a higher hierarchical position relative to the current entity, such that a total number of related entities displayed on the graphical user interface does not exceed the predetermined number; and
changing the relative position of the current entity within the graphical user interface to reflect the higher hierarchical position of the at least one additional related entity.

24. The computer program product of claim 23, wherein the hierarchical structure representation of the entities is generated based on a parent child relationship of a first entity relative to a second entity in the plurality of entities.

25. The computer program product of claim 24, wherein an entity in the plurality of entities includes at least one attribute, and wherein the parent child relationship of the first entity relative to the second entity is defined as a relationship between an attribute of the first entity and an attribute of the second entity.

26. The computer program product of claim 23, wherein the instructions to display the related entities comprises instructions to display one or more of a sibling entity of the current entity and an entity at a level higher than a level of the current entity, the entity at the higher level associated with the current entity via the parent-child relationship.

27. The computer program product of claim 26, wherein the instructions to display the related entities comprises instructions to display one portion of the number of related entities above the current entity and instructions to display a remaining portion of the number of related entities below the current entity.

28. The computer program product of claim 27, wherein the instructions to display the remaining portion of the number of related entities below the current entity comprises instructions to display no child entity of the current entity and no repeat displaying of an entity already displayed above the current entity.

29. The computer program product of claim 28, wherein updating the display of the current entity and related entities based on detecting the scrolling up action comprises displaying additional entities related to the current entity in an indented format, the additional entities including one or more of a sibling entity of the current entity and an entity at a level higher than a level of the current entity in the hierarchical structure representation of the entities, the entity at the higher level associated with the current entity via the parent-child relationship.

30. The computer program product of claim 29, wherein a position of the current entity is maintained until information about a different current entity is received.

31. The computer program product of claim 30, further comprising instructions to update the display of the current entity and the related entities based on detecting a scrolling down action, an expand option or a collapse action on the graphical user interface.

32. The computer program product of claim 31, wherein the scrolling down option causes displaying of additional sibling entities of the current entity.

33. The computer program product of claim 32, wherein the expand option and the collapse action affect the current entity or one of the related entities, the expand option causing displaying of at least one child entity of an affected entity, the collapse option causing no displaying of any child entity of the affected entity.

* * * * *